US011766952B2

(12) United States Patent
Mori et al.

(10) Patent No.: US 11,766,952 B2
(45) Date of Patent: Sep. 26, 2023

(54) POWER SUPPLY CIRCUIT, POWER SUPPLY METHOD, AND STORAGE MEDIUM

(71) Applicant: TOYOTA JIDOSHA KABUSHIKI KAISHA, Toyota (JP)

(72) Inventors: Tatsunori Mori, Toyota (JP); Hikaru Suzuki, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/897,492

(22) Filed: Aug. 29, 2022

(65) Prior Publication Data
US 2023/0098286 A1    Mar. 30, 2023

(30) Foreign Application Priority Data
Sep. 24, 2021   (JP) .................................. 2021-155599

(51) Int. Cl.
B60L 58/18    (2019.01)
H02J 7/00     (2006.01)
H02M 3/158    (2006.01)
H02J 9/06     (2006.01)

(52) U.S. Cl.
CPC ............ B60L 58/18 (2019.02); H02J 7/0047 (2013.01); H02J 9/061 (2013.01); H02M 3/1582 (2013.01); B60L 2210/12 (2013.01); B60L 2210/14 (2013.01); H02J 2207/20 (2020.01)

(58) Field of Classification Search
CPC .. B60L 58/18; B60L 2210/12; B60L 2210/14; H02J 7/0047; H02J 9/061; H02J 2207/20; H02M 3/1582
See application file for complete search history.

(56) References Cited

U.S. PATENT DOCUMENTS

| 6,442,702 | B1 | 8/2002 | Ishikawa et al. |
| 2009/0058371 | A1 | 3/2009 | Nakajima et al. |
| 2017/0158082 | A1 | 6/2017 | Tahara |
| 2019/0148937 | A1* | 5/2019 | Kawamoto ............ H02J 1/102 |
| | | | 307/80 |
| 2020/0102001 | A1 | 4/2020 | Kozuka et al. |
| 2021/0229610 | A1 | 7/2021 | Shimamoto et al. |
| 2022/0001817 | A1 | 1/2022 | Sakamoto |
| 2022/0063712 | A1 | 3/2022 | Kajisawa et al. |
| 2022/0080904 | A1 | 3/2022 | Fujita et al. |

(Continued)

FOREIGN PATENT DOCUMENTS

| JP | 10-290526 A | 10/1998 |
| JP | 2000-172385 A | 6/2000 |

(Continued)

Primary Examiner — Elim Ortiz
(74) Attorney, Agent, or Firm — Oblon, McClelland, Maier & Neustadt, L.L.P.

(57) ABSTRACT

In the case where a predetermined condition related to a load is satisfied in a first state in which electric power is supplied from a second power supply source to the load via a second electric circuit and not supplied to the load via a third electric circuit when electric power cannot be supplied from a first power supply source to the load, a control unit controls a converting unit and a switching unit to establish a second state in which electric power is supplied from the second power supply source to the load via the second electric circuit and the third electric circuit.

5 Claims, 6 Drawing Sheets

(56) References Cited

U.S. PATENT DOCUMENTS

| | | | |
|---|---|---|---|
| 2022/0140647 A1 | 5/2022 | Takahashi | |
| 2022/0289057 A1* | 9/2022 | Tsuchiya | B60L 53/24 |

FOREIGN PATENT DOCUMENTS

| | | |
|---|---|---|
| JP | 2000-228829 A | 8/2000 |
| JP | 2001-157361 A | 6/2001 |
| JP | 2003-291752 A | 10/2003 |
| JP | 2007-307931 A | 11/2007 |
| JP | 2007-320456 A | 12/2007 |
| JP | 2008-149856 A | 7/2008 |
| JP | 4702368 B2 | 6/2011 |
| JP | 5546685 B2 | 7/2014 |
| JP | 2014-141158 A | 8/2014 |
| JP | 2014-169013 A | 9/2014 |
| JP | 2014-232948 A | 12/2014 |
| JP | 6056988 B2 | 1/2017 |
| JP | 2018-82579 A | 5/2018 |
| JP | 2019-80396 A | 5/2019 |
| JP | 2019-193493 A | 10/2019 |
| JP | 2020-13181 A | 1/2020 |
| JP | 2020-50293 A | 4/2020 |
| JP | 2020-108219 A | 7/2020 |
| JP | 2020-108220 A | 7/2020 |
| JP | 2020-157907 A | 10/2020 |
| JP | 2021-109495 A | 8/2021 |
| JP | 2021-160397 A | 10/2021 |
| JP | 2022-1472 A | 1/2022 |
| JP | 2022-39398 A | 3/2022 |
| JP | 2022-39399 A | 3/2022 |
| JP | 2022-47413 A | 3/2022 |
| JP | 2022-72557 A | 5/2022 |
| JP | 2022-73515 A | 5/2022 |
| WO | WO 2007/135497 A2 | 11/2007 |

* cited by examiner form the second power supply source to the load. When a predetermined condition related to the load is satisfied after the control unit controls the converting unit and the switching unit so as to establish the first state, the control unit controls the converting unit, and controls the switching unit so as to electrically connect the second power supply source and the load such that a second state in which electric power is supplied from the second power supply source to the load via the second electric circuit and the third electric circuit is established.

POWER SUPPLY CIRCUIT, POWER SUPPLY METHOD, AND STORAGE MEDIUM

CROSS-REFERENCE TO RELATED APPLICATION

This application claims priority to Japanese Patent Application No. 2021-155599 filed on Sep. 24, 2021, incorporated herein by reference in its entirety.

BACKGROUND

1. Technical Field

The present disclosure relates to a technical field of a power supply circuit mounted on a vehicle, a power supply method in the power supply circuit, and a storage medium.

2. Description of Related Art

As a circuit of this type, for example, in a vehicle, an on-board backup circuit that supplies electric power to a power supply target when the power supply from a power source unit is cut off, and includes a first voltage converting unit and a second voltage converting unit has been proposed. The backup circuit causes the second voltage converting unit to perform a voltage conversion operation when a first backup condition is satisfied and causes the first voltage converting unit to perform a second operation on condition that a second backup condition is satisfied when the second voltage converting unit is performing the voltage conversion operation (refer to Japanese Unexamined Patent Application Publication No. 2019-193493 (JP 2019-193493 A)).

SUMMARY

In the power supply circuit, a significant voltage drop due to a steep (or sudden) load increase may occur. The technique described in JP 2019-193493 A has a technical issue that countermeasures against such a significant voltage drop are insufficient.

The present disclosure has been made in view of the above issue, and it is an object of the present disclosure is to provide a power supply circuit, a power supply method, and a storage medium capable of handling a steep load increase.

A power supply circuit according to one aspect of the disclosure is a power supply circuit mounted on a vehicle, and includes: a first electric circuit that electrically connects a first power supply source and a load; a second electric circuit that electrically connects a second power supply source and the load and that includes a converting unit that converts a voltage related to electric power supplied to the load; a third electric circuit that electrically connects the second power supply source and the load without intervening the converting unit and that includes a switching unit able to disconnect an electrical connection between the second power supply source and the load; a control unit that controls the converting unit, and controls the switching unit so as to disconnect the electrical connection between the second power supply source and the load such that a first state is established, the first state being a state in which electric power is supplied from the second power supply source to the load via the second electric circuit and electric power is not supplied to the load via the third electric circuit when electric power is not able to be supplied from the first power supply source to the load but is able to be supplied A power supply method according to one aspect of the present disclosure is a power supply method in a power supply circuit including a first electric circuit that electrically connects a first power supply source and a load, a second electric circuit that electrically connects a second power supply source and the load and that includes a converting unit that converts voltage related to electric power supplied to the load, and a third electric circuit that electrically connects the second power supply source and the load without intervening the converting unit and that includes a switching unit able to disconnect an electrical connection between the second power supply source and the load, and includes: a first control process of controlling the converting unit, and controlling the switching unit so as to disconnect the electrical connection between the second power supply source and the load such that a first state is established, the first state being a state in which electric power is supplied from the second power supply source to the load via the second electric circuit and electric power is not supplied to the load via the third electric circuit when electric power is not able to be supplied from the first power supply source to the load but is able to be supplied from the second power supply source to the load; and a second control process of controlling, when a predetermined condition related to the load is satisfied after the converting unit and the switching unit are controlled so as to establish the first state, the converting unit, and controlling the switching unit so as to electrically connect the second power supply source and the load such that a second state in which electric power is supplied from the second power supply source to the load via the second electric circuit and the third electric circuit is established.

A storage medium according to one aspect of the present disclosure stores a computer program causing a computer of a power supply circuit to function as a control unit, the power supply circuit including a first electric circuit that electrically connects a first power supply source and a load, a second electric circuit that electrically connects a second power supply source and the load and that includes a converting unit that converts voltage related to electric power supplied to the load, and a third electric circuit that electrically connects the second power supply source and the load without intervening the converting unit and that includes a switching unit able to disconnect an electrical connection between the second power supply source and the load. The control unit controls the converting unit, and controls the switching unit so as to disconnect the electrical connection between the second power supply source and the load such that a first state is established, the first state being a state in which electric power is supplied from the second power supply source to the load via the second electric circuit and electric power is not supplied to the load via the third electric circuit when electric power is not able to be supplied from the first power supply source to the load but is able to be supplied from the second power supply source to the load, and when a predetermined condition related to the load is satisfied after the control unit controls the converting unit and the switching unit so as to establish the first state, the control unit controls the converting unit, and controls the switching unit so as to electrically connect the second power supply source and the load such that a second state in which electric power is supplied from the second power supply source to the load via the second electric circuit and the third electric circuit is established.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a power supply circuit will be described with reference to FIGS. 1 to 6. Here, as an example, a power source electronic control unit (ECU) 10 mounted on a vehicle 1 is given as an example of the power supply circuit.

Figure 1:
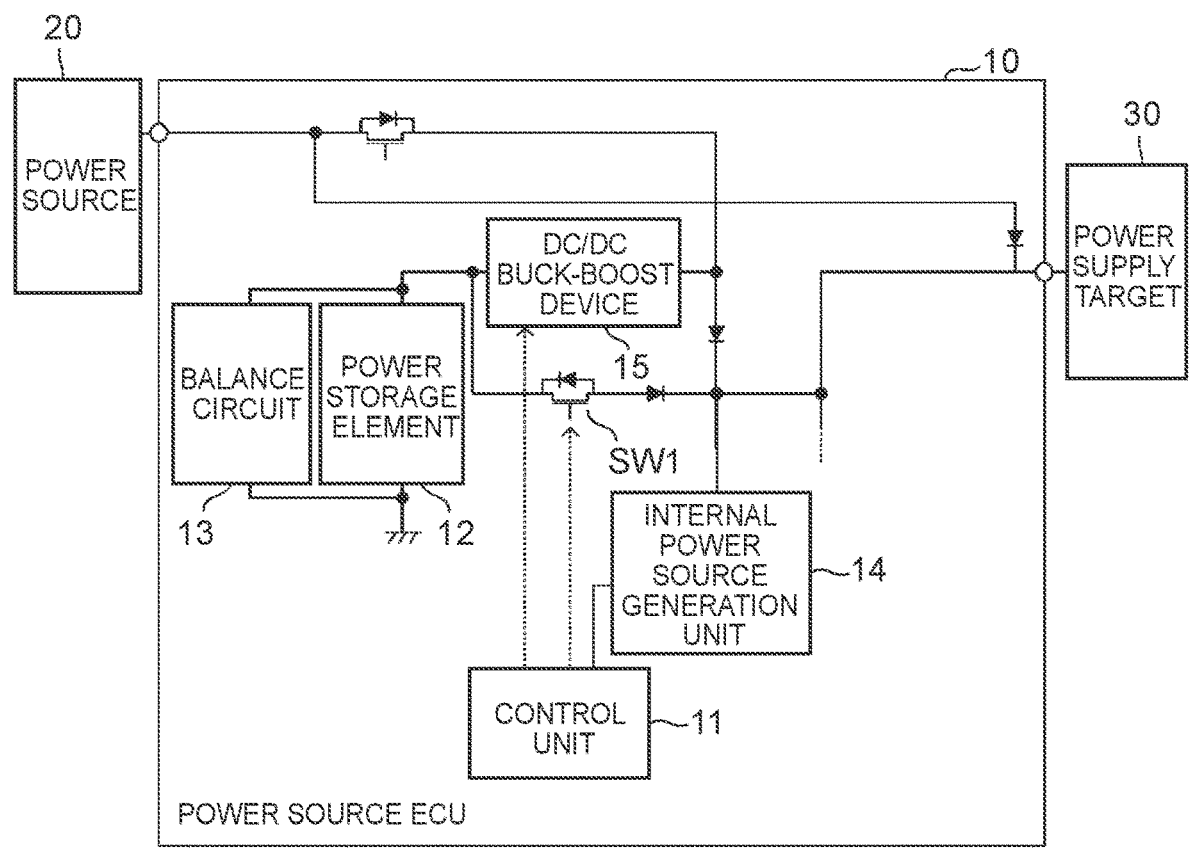
FIG. 1 is a diagram showing a configuration of a power source electronic control unit (ECU) according to an embodiment.

In FIG. 1, the power source ECU 10 is disposed on an electric circuit that electrically connects a power source 20 such as a battery and a power supply target 30 such as a vehicle auxiliary machine. The power source ECU 10 includes a control unit 11, a power storage element 12, a balance circuit 13, an internal power source generation unit 14, and a direct-current (DC)/DC buck-boost device 15.

The control unit 11 is configured to be able to control, for example, the DC/DC buck-boost device 15, a switch SW1, and the like. The power storage element 12 includes, for example, a plurality of capacitors. The balance circuit 13 equalizes the voltage of each of the capacitors constituting the power storage element 12, for example. The internal power source generation unit 14 is configured to be capable of supplying electric power to the control unit 11. Various existing modes can be applied to the power storage element 12, the balance circuit 13, the internal power source generation unit 14, and the DC/DC buck-boost device 15. Therefore, the details thereof will be omitted.

Figure 2:
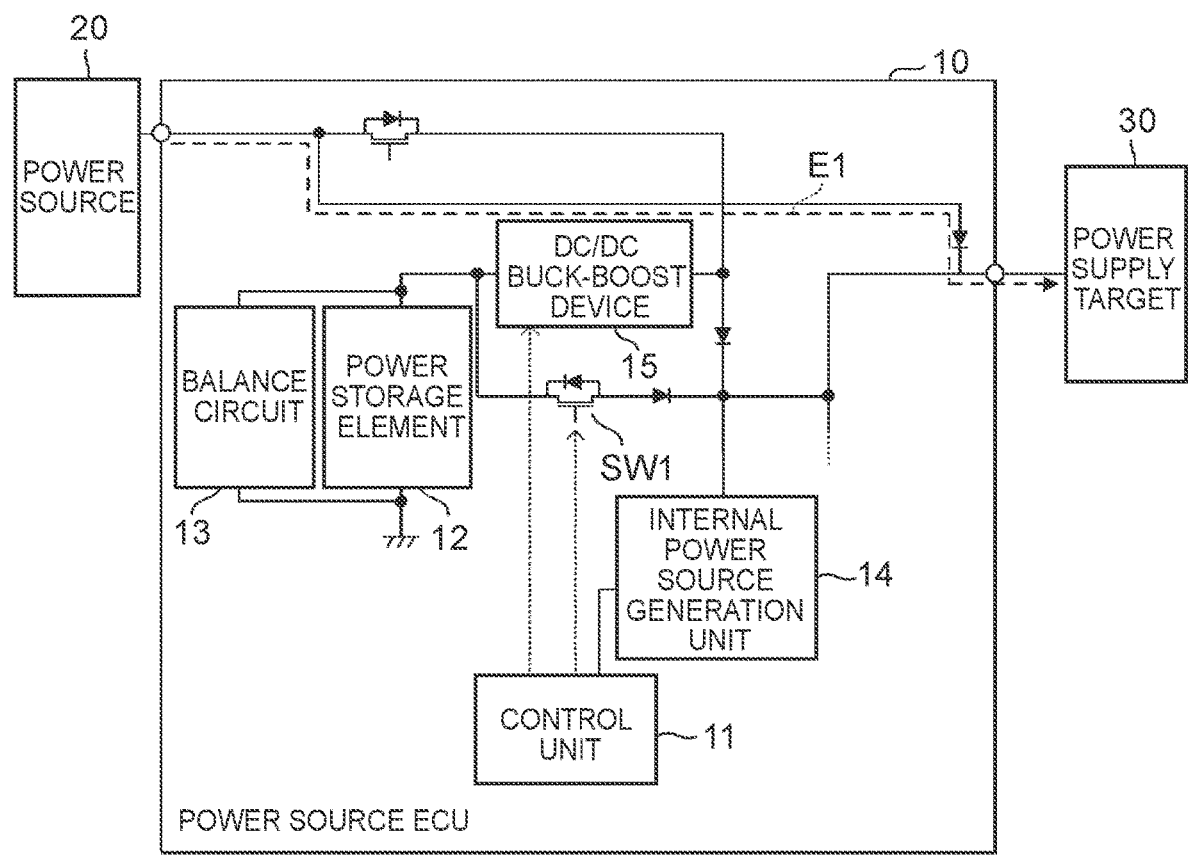
FIG. 2 is a diagram showing an example of a power supply path in the power source ECU according to the embodiment.

Next, the electric circuit of the power source ECU 10 will be described with reference to FIGS. 2 to 5. In FIG. 2, when electric power is output from the power source 20, the electric power output from the power source 20 is supplied to the power supply target 30 by an electric circuit E1. The state shown in FIG. 2 is hereinafter referred to as an "operating state 1".

When electric power is output from the power source 20, the power storage element 12 may be charged by supplying a part of the electric power output from the power source 20 to the power storage element 12. Further, in this case, a part of the electric power output from the power source 20 may be supplied to the control unit 11 via the internal power source generation unit 14.

Figure 3:
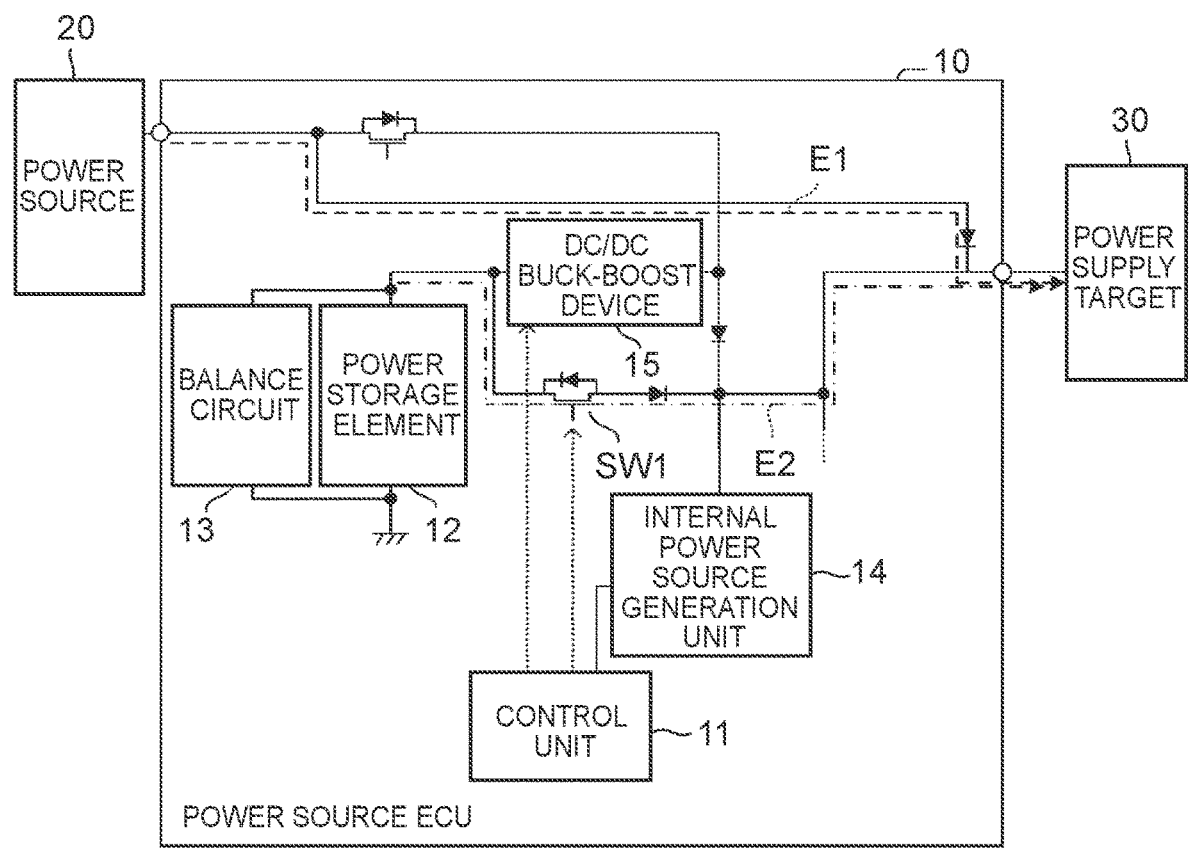
FIG. 3 is a diagram showing another example of the power supply path in the power source ECU according to the embodiment.

In FIG. 3, when electric power is output from the power source 20 and charging of the power storage element 12 is completed, the control unit 11 turns on the switch SW1. At this time, the electric power output from the power storage element 12 is supplied to the power supply target 30 by the electric circuit E2 passing through the switch SW1. In this case, the electric power is supplied to the power supply target 30 from both the power source 20 and the power storage element 12. The state shown in FIG. 3 is hereinafter referred to as an "operating state 2".

When a power storage amount of the power storage element 12 decreases to a predetermined amount due to continuation of the operating state 2, the operating state 2 transitions to the operating state 1 on condition that the electric power is output from the power source 20. That is, when the electric power is output from the power source 20, charging and discharging of the power storage element 12 are alternately repeated, whereby the operating state is alternately switched between the operating state 1 and the operating state 2. Note that, the "predetermined amount" may be set as a power storage amount at which the power storage element 12 needs to be charged.

Figure 4:
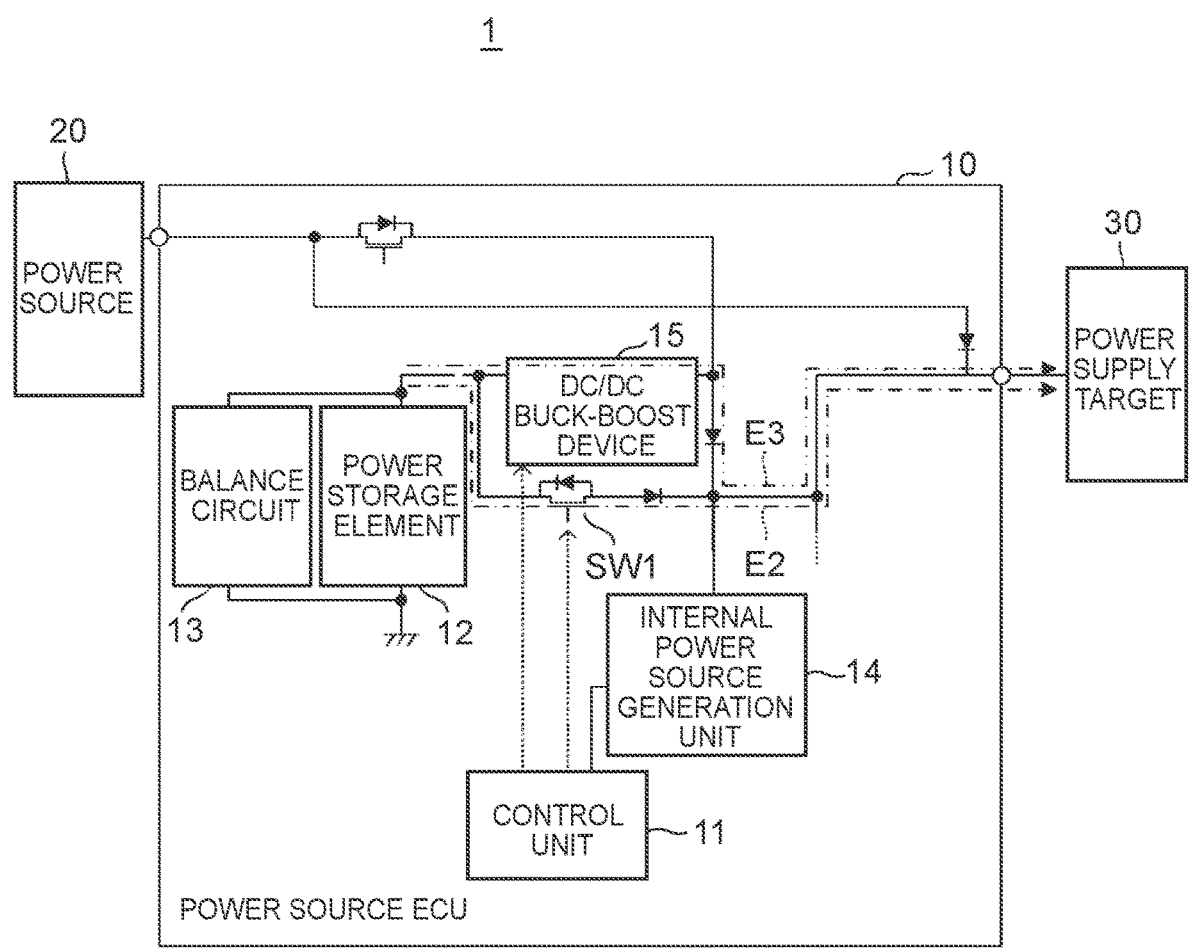
FIG. 4 is a diagram showing another example of the power supply path in the power source ECU according to the embodiment.

In FIG. 4, when the electric power is not output from the power source 20 for some reason (that is, when the power source 20 fails), the control unit 11 turns on the switch SW1 and activates the DC/DC buck-boost device 15 on condition that the power storage element 12 has a sufficient power storage amount. In addition, "the power storage element 12 has a sufficient power storage amount" means that the power storage element 12 has a power storage amount at which the electric power can be supplied to the power supply target 30.

In this case, the electric power output from the power storage element 12 is supplied to the power supply target 30 by the electric circuit E2 described above and an electric circuit E3 passing through the DC/DC buck-boost device 15. Further, in this case, a part of the electric power output from the power storage element 12 may be supplied to the control unit 11 via the internal power source generation unit 14. The state shown in FIG. 4 is hereinafter referred to as an "operating state 3". Note that, the circuit constituting each of the electric circuits E3 and E4 is hereinafter referred to as a "backup circuit".

Figure 5:
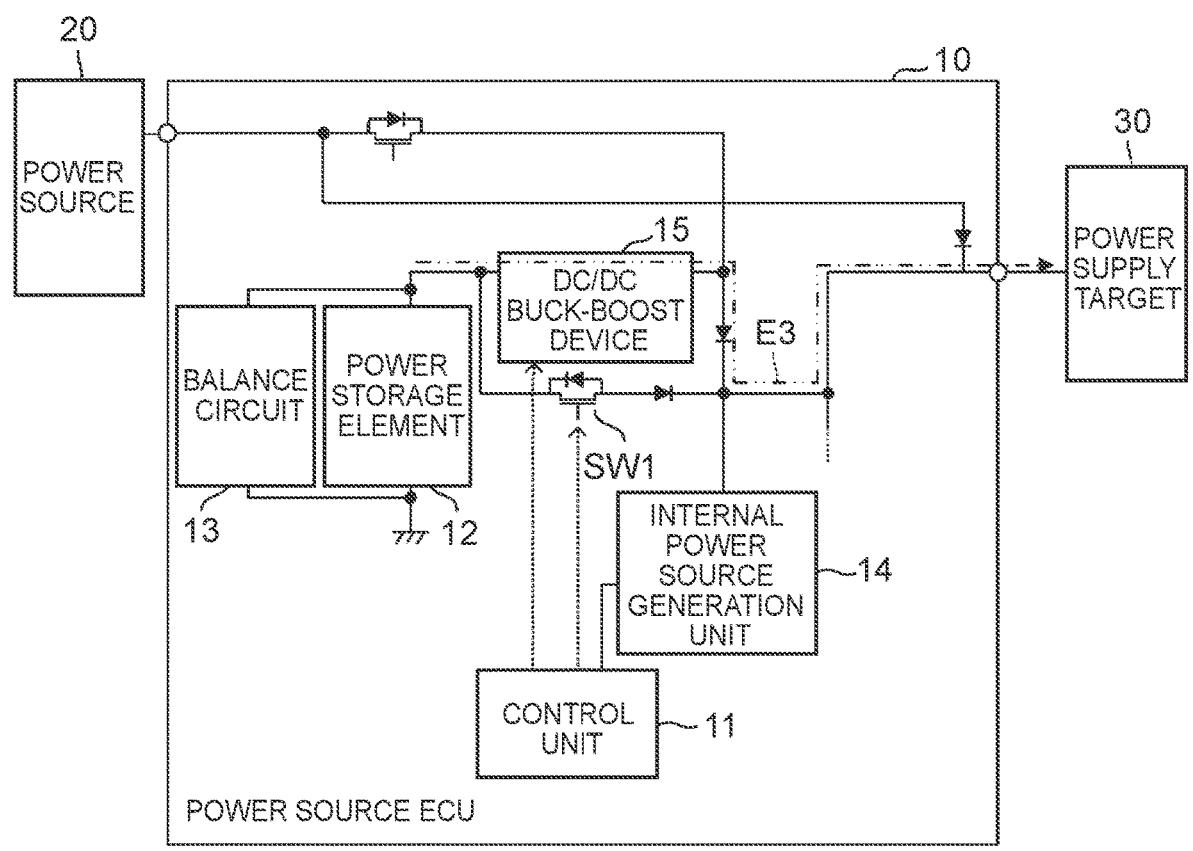
FIG. 5 is a diagram showing another example of the power supply path in the power source ECU according to the embodiment.

When a predetermined period has elapsed after the operating state 3 is established, the control unit 11 turns the switch SW1 off. As a result, as shown in FIG. 5, the electric power output from the power storage element 12 is supplied to the power supply target 30 by the electric circuit E3 described above. With such a configuration, it is possible to suppress consumption of electric power, whereby it is possible to suppress a decrease in the power storage amount of the power storage element 12. The state shown in FIG. 5 is hereinafter referred to as an "operating state 4".

In the operating state 4, the power supply target 30 is often in a standby mode. At this time, for example, when the power supply target 30 attempts to return from or start up in the standby mode due to some operation (for example, pressing a switch, operating a touch panel) by the user of the vehicle 1, a significant voltage drop may occur due to a sudden load increase in many cases.

Here, in order for the control unit 11 to operate properly, a predetermined voltage such as eight volts needs to be applied to the control unit 11. When the voltage applied to the control unit 11 falls below the predetermined voltage due to the significant voltage drop described above, the control unit 11 cannot maintain its operation. Then, the electric power is not supplied to the power supply target 30. That is, when the above-mentioned significant voltage drop occurs, the operations of the power source ECU 10 and the power supply target 30 are affected.

Therefore, the power source ECU 10 is configured to detect a sign of load increase. Then, when the sign of load increase is detected while the power source ECU 10 is in the operating state 4, the switch SW1 is turned on so as to transition from the operating state 4 to the operating state 3. With this configuration, when the power supply target 30 attempts to recover from or start up in the standby mode, sufficient electric power (or current) can be supplied to the power supply target 30, and the occurrence of a voltage drop can be suppressed.

Figure 6:
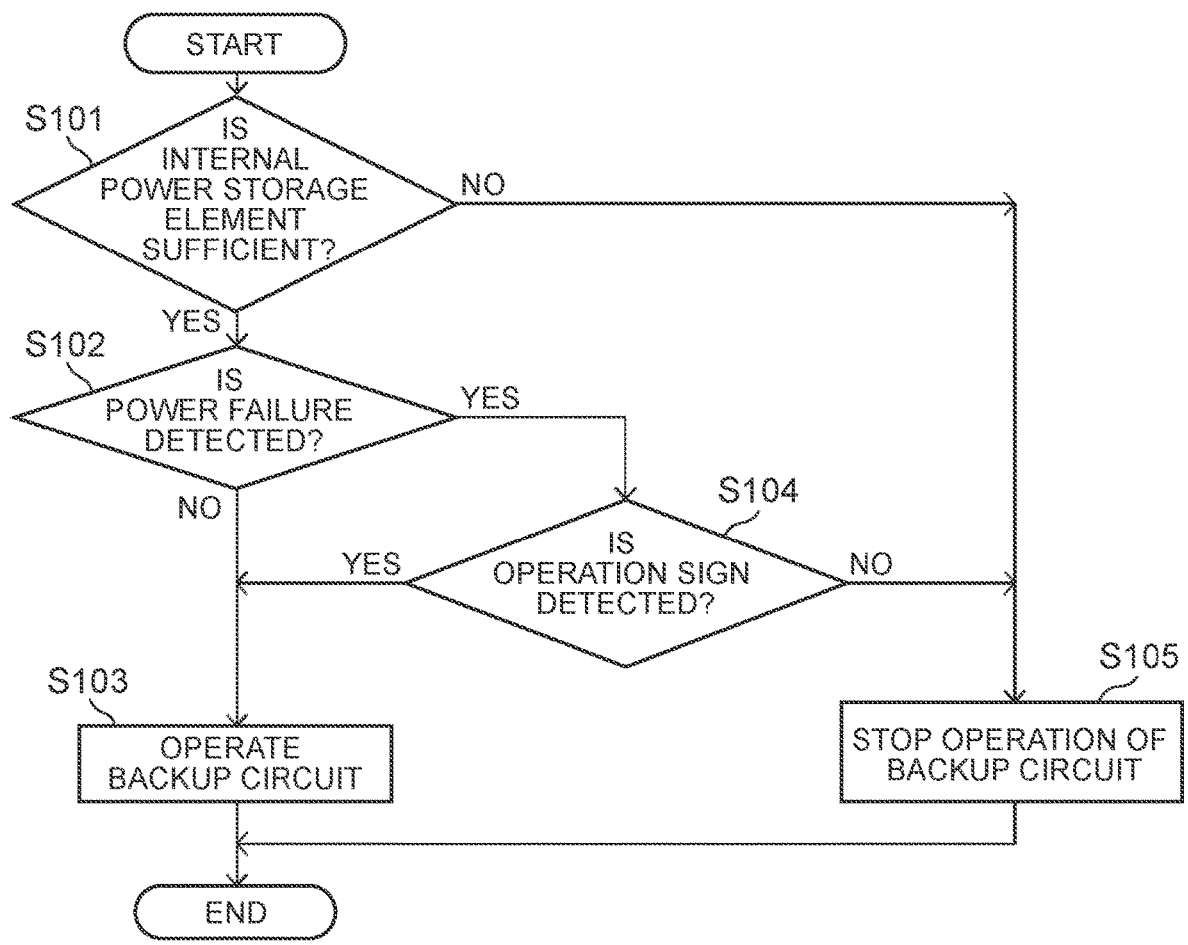
FIG. 6 is a flowchart showing an operation of the power source ECU according to the embodiment.

The operation of the power source ECU 10 will be described with reference to the flowchart in FIG. 6. In FIG. 6, the control unit 11 of the power source ECU 10 determines whether the power storage amount of the power storage element 12 is sufficient in the operating state 1 (step S101). When the control unit 11 determines in the process of step S101 that the power storage amount of the power storage element 12 is not sufficient (step S101: No), charging of the power storage element 12 is not completed, whereby the control unit 11 stops the operation of the backup circuit (or maintain the stopped state) (step S105). In this case, the operating state 1 is continued.

When the control unit 11 determines in the process of step S101 that the power storage amount of the power storage element 12 is sufficient (step S101: Yes), the control unit 11 determines whether the power failure is detected (step S102). When the control unit 11 determines in the process of step S102 that the power failure is not detected (step S102: No), the control unit 11 turns on the switch SW1 and operates the backup circuit (step S103). In this case, the operating state 1 transitions to the operating state 2.

When the control unit 11 determines in the process of step S102 that a power failure is detected (step S102: Yes), the control unit 11 turns on the switch SW1 and activates the DC/DC buck-boost device 15. In this case, the operating state 1 transitions to the operating state 3. After that, when a predetermined period elapses, the control unit 11 turns off the switch SW1 while maintaining activation of the DC/DC buck-boost device 15. As a result, the operating state 3 transitions to the operating state 4.

After that, the control unit 11 determines whether an operation sign (that is, a sign of load increase) of the power supply target 30 is detected (step S104). When the control unit 11 determines in the process of step S104 that the operation sign of the power supply target 30 is detected (step S104: Yes), the control unit 11 turns on the switch SW1 and maintains activation of the DC/DC buck-boost device 15 (step S103). As a result, the operating state 4 transitions to the operating state 3.

When the control unit 11 determines in the process of step S104 that the operation sign of the power supply target 30 is not detected (step S104: No), the control unit 11 maintains activation of the DC/DC buck-boost device 15. In this case, the operating state 4 is maintained. After that, for example, when the power storage amount of the power storage element 12 decreases, the power supply to the power supply target 30 is stopped (step S105).

The above-mentioned sign of load increase (or the operation sign of the power supply target 30) will be described. The sign of load increase differs depending on the type of power supply target 30. When the power supply target 30 is, for example, a self-diagnostic device of the vehicle 1, the self-diagnostic device may start up when the power source 20 continues to fail to some extent. In this case, the control unit 11 may determine that there is a sign of load increase when the elapsed time from when the electric power is not supplied from the power source 20 to the power supply target 30 is longer than a predetermined time. That is, the fact that the predetermined time has elapsed since the power supply from the power source 20 to the power supply target 30 is stopped is an example of a sign of load increase.

When the power supply target 30 is, for example, a device that transmits a power supply request signal to the control unit 11 of the power source ECU 10 before start-up, the control unit 11 may determine that there is a sign of load increase upon receipt of the power supply request signal. That is, the event that the power supply request signal is transmitted from the power supply target 30 to the control unit 11 is another example of a sign of load increase.

When the power supply target 30 is, for example, a device that starts up when the vehicle 1 collides, the control unit 11 may determine that there is a sign of load increase when an impact applied to the vehicle 1 is detected. That is, the event that an impact applied to the vehicle 1 is detected is another example of a sign of load increase.

When the power supply target 30 is, for example, a device (such as an interior light) that is activated by opening and closing of the door of the vehicle 1, the control unit 11 may determine that there is a sign of load increase when the door of the vehicle 1 is operated. That is, the vent that the door of the vehicle 1 is operated is another example of a sign of load increase.

Further, the control unit 11 may determine that there is a sign of load increase when the power storage amount of the power storage element 12 becomes relatively small. This is because power supply to the power supply target 30 becomes difficult, and thus a significant voltage drop is likely to occur. That is, the event that the power storage amount of the power storage element 12 decreases is another example of a sign of load increase.

Technical Effect

In the power source ECU 10, when the power source 20 fails and a sign of load increase is detected in the operating state 4, the operating state 4 transitions to the operating state 3. Transition from the operating state 4 to the operating state 3 makes it easier to supply relatively large electric power (or current) to the power supply target 30. As a result, the degree of voltage drop when the power supply target 30 is activated can be suppressed. Therefore, according to the power source ECU 10, it is possible to handle a steep load increase. In the method of the above-described embodiment, it is not necessary to change the circuit configuration constituting the power source ECU 10. Therefore, it is possible to avoid an increase in product cost and an increase in the occupied area of the circuit, for example, which is very advantageous in practical use.

Computer Program

Figure 7:
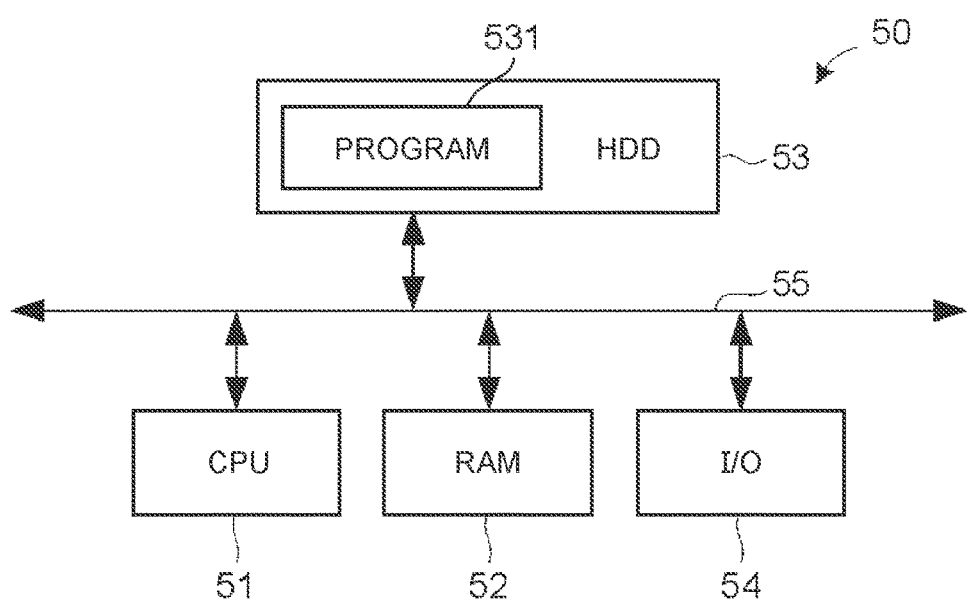
FIG. 7 is a block diagram showing a configuration of a computer according to the embodiment.

An embodiment of a computer program will be described with reference to FIG. 7. FIG. 7 is a block diagram showing a configuration of a computer according to the embodiment.

In FIG. 7, a computer 50 constitutes a part of the power source ECU 10 described above (for example, the control unit 11). The computer 50 includes a central processing unit (CPU) 51, a random access memory (RAM) 52, a hard disk drive (HDD) 53, and an input/output (I/O) 54. The CPU 51, the RAM 52, the HDD 53 and the I/O 54 are connected to each other by a bus 55. A computer program 531 according to the present embodiment is stored in the HDD 53 in advance.

The computer 50 may include, in place of or in addition to the HDD 53, a non-volatile memory such as an electrically erasable programmable read-only memory (EEPROM). The computer program 531 may be stored in the non-volatile memory.

Processing of the CPU 51 in accordance with the computer program 531 will be described. The CPU 51 determines whether the power storage amount of the power storage element 12 is sufficient in the operating state 1. When the CPU 51 determines that the power storage amount of the power storage element 12 is not sufficient, the CPU 51 stops the operation of the backup circuit (or maintains the stopped state). In this case, the operating state 1 is continued. On the other hand, when the CPU 51 determines that the power storage amount of the power storage element 12 is sufficient, the CPU 51 determines whether the power failure is detected.

When the CPU 51 determines that the power failure is not detected, the CPU 51 turns on the switch SW1 and operates the backup circuit. In this case, the operating state 1 transitions to the operating state 2. On the other hand, when the CPU 51 determines that the power failure is detected, the CPU 51 turns on the switch SW1 and activates the DC/DC buck-boost device 15. This causes the operating state 1 to transition to the operating state 3. After that, when a predetermined period elapses, the CPU 51 turns off the switch SW1 while maintaining activation of the DC/DC buck-boost device 15. This causes the operating state 3 to transition to the operating state 4.

After that, the CPU 51 determines whether the operation sign of the power supply target 30 is detected in the operating state 4. When the CPU 51 determines that the operation sign of the power supply target 30 is detected, the CPU 51 turns on the switch SW1 and maintains the activation of the DC/DC buck-boost device 15. This causes the operating state 4 to transition to the operating state 3. On the other hand, when the CPU 51 determines that the operation sign of the power supply target 30 is not detected, the CPU 51 maintains the activation of the DC/DC buck-boost device 15. In this case, the operating state 4 is continued.

The computer program 531 may be stored in the HDD 53 as the computer 50 reads the computer program 531 from a recording medium such as an optical disk such as a compact disc read-only memory (CD-ROM) or a universal serial bus (USB) memory that stores the computer program 531, for example. Alternatively, the computer program 531 may be stored in the HDD 53 as the computer 50 downloads the computer program 531 via a network such as the Internet.

According to the computer program 531, it is possible to handle a steep load increase as in the power source ECU 10 in the above-described embodiment. According to the computer program 531, it is possible to realize the power source ECU 10 in the above-described embodiment relatively easily.

Various aspects of the disclosure derived from the embodiments described above will be described below.

A power supply circuit according to one aspect of the disclosure is a power supply circuit mounted on a vehicle, and includes: a first electric circuit that electrically connects a first power supply source and a load; a second electric circuit that electrically connects a second power supply source and the load and that includes a converting unit that converts a voltage related to electric power supplied to the load; a third electric circuit that electrically connects the second power supply source and the load without intervening the converting unit and that includes a switching unit able to disconnect an electrical connection between the second power supply source and the load; a control unit that controls the converting unit, and controls the switching unit so as to disconnect the electrical connection between the second power supply source and the load such that a first state is established, the first state being a state in which electric power is supplied from the second power supply source to the load via the second electric circuit and electric power is not supplied to the load via the third electric circuit when electric power is not able to be supplied from the first power supply source to the load but is able to be supplied from the second power supply source to the load. When a predetermined condition related to the load is satisfied after the control unit controls the converting unit and the switching unit so as to establish the first state, the control unit controls the converting unit, and controls the switching unit so as to electrically connect the second power supply source and the load such that a second state in which electric power is supplied from the second power supply source to the load via the second electric circuit and the third electric circuit is established.

In the above-described embodiments, the "power source ECU 10" corresponds to an example of the "power supply circuit", the "power source 20" corresponds to an example of the "first power supply source", the "power storage element 12" corresponds to the "second power supply source", the "power supply target 30" corresponds to an example of the "load", the "DC/DC buck-boost device 15" corresponds to an example of the "converting unit", the "switch SW1" corresponds to an example of the "switching unit", and the "control unit 11" corresponds to an example of the "control unit". In the above-described embodiments, the "electric circuit E1" corresponds to an example of the "first electric circuit", the "electric circuit E3" corresponds to an example of the "second electric circuit", the "electric circuit E2" corresponds to an example of the "third electric circuit", the "operating state 4" corresponds to an example of the "first state", and the "operating state 3" corresponds to an example of the "second operating state".

The power supply circuit may include a detection unit that detects a preliminary state related to the load. The predetermined condition may be that the preliminary state is detected by the detection unit. In the above-described embodiments, the "control unit 11" corresponds to an example of the "detection unit", and the "sign of load increase" corresponds to an example of the "preliminary state related to the load".

Here, the preliminary state may be at least one of states that (i) a predetermined time has elapsed since electric power is not supplied from the first power supply source to the load, (ii) a power supply request is made from the load to the control unit, (iii) an impact applied to the vehicle is detected, (iv) a door of the vehicle is operated, and (v) a power storage amount related to the second power supply source decreases.

In the power supply circuit, when electric power is not able to be supplied from the first power supply source to the load but is able to be supplied from the second power supply source to the load, the control unit may control the converting unit and the switching unit so as to establish the first state after the control unit controls the converting unit and the switching unit so as to establish the second state, when the predetermined condition is satisfied, the control unit may control the converting unit and the switching unit such that the first state transitions to the second state, and when the predetermined condition is not satisfied, the control unit may control the converting unit and the switching unit so as to maintain the first state.

A power supply method according to one aspect of the present disclosure is a power supply method in a power supply circuit including a first electric circuit that electrically connects a first power supply source and a load, a second electric circuit that electrically connects a second power supply source and the load and that includes a converting unit that converts voltage related to electric power supplied to the load, and a third electric circuit that electrically connects the second power supply source and the load without intervening the converting unit and that includes a switching unit able to disconnect an electrical connection between the second power supply source and the load, and includes: a first control process of controlling the converting unit, and controlling the switching unit so as to disconnect the electrical connection between the second power supply source and the load such that a first state is established, the first state being a state in which electric power is supplied from the second power supply source to the load via the second electric circuit and electric power is not supplied to the load via the third electric circuit when electric power is not able to be supplied from the first power supply source to the load but is able to be supplied from the second power supply source to the load; and a second control process of controlling, when a predetermined condition related to the load is satisfied after the converting unit and the switching unit are controlled so as to establish the first state, the converting unit, and controlling the switching unit so as to electrically connect the second power supply source and the load such that a second state in which electric power is supplied from the second power supply source to the load via the second electric circuit and the third electric circuit is established.

A storage medium according to one aspect of the present disclosure stores a computer program causing a computer of a power supply circuit to function as a control unit, the power supply circuit including a first electric circuit that electrically connects a first power supply source and a load, a second electric circuit that electrically connects a second power supply source and the load and that includes a converting unit that converts voltage related to electric power supplied to the load, and a third electric circuit that electrically connects the second power supply source and the load without intervening the converting unit and that includes a switching unit able to disconnect an electrical connection between the second power supply source and the load. The control unit controls the converting unit, and controls the switching unit so as to disconnect the electrical connection between the second power supply source and the load such that a first state is established, the first state being a state in which electric power is supplied from the second power supply source to the load via the second electric circuit and electric power is not supplied to the load via the third electric circuit when electric power is not able to be supplied from the first power supply source to the load but is able to be supplied from the second power supply source to the load, and when a predetermined condition related to the load is satisfied after the control unit controls the converting unit and the switching unit so as to establish the first state, the control unit controls the converting unit, and controls the switching unit so as to electrically connect the second power supply source and the load such that a second state in which electric power is supplied from the second power supply source to the load via the second electric circuit and the third electric circuit is established.

The present disclosure is not limited to the above-described embodiment, and can be appropriately modified within the scope of the claims and within the scope not contrary to the gist or idea of the disclosure that can be read from the entire specification. The power supply circuit, the power supply method, and the storage medium accompanied by such a modification are also included in the technical scope of the present disclosure.

What is claimed is:

1. A power supply circuit mounted on a vehicle, comprising:
    a first electric path that electrically connects a first power supply source and a load;
    a second electric path that electrically connects a second power supply source and the load and that includes a converting unit that converts a voltage related to electric power supplied to the load;
    a third electric path that electrically connects the second power supply source and the load without intervening the converting unit and that includes a switching unit able to disconnect an electrical connection between the second power supply source and the load; and
    a control unit that controls the converting unit, and controls the switching unit of the third electric path so as to disconnect the electrical connection between the second power supply source and the load via the third electric path such that a first state is established, the first state being a state in which electric power is supplied from the second power supply source to the load via the second electric path and electric power is not supplied to the load via the third electric path when electric power is not able to be supplied from the first power supply source to the load but is able to be supplied from the second power supply source to the load, wherein when a predetermined condition related to the load is satisfied after the control unit controls the converting unit and the switching unit so as to establish the first state, the control unit controls the converting unit, and controls the switching unit so as to electrically connect the second power supply source and the load such that a second state in which electric power is supplied from the second power supply source to the load via the second electric path and the third electric path is established,
    wherein:
    when electric power is not able to be supplied from the first power supply source to the load but is able to be supplied from the second power supply source to the load, the control unit controls the converting unit and the switching unit so as to establish the first state after the control unit controls the converting unit and the switching unit so as to establish the second state,
    when the predetermined condition is satisfied, the control unit controls the converting unit and the switching unit such that the first state transitions to the second state, and
    when the predetermined condition is not satisfied, the control unit controls the converting unit and the switching unit so as to maintain the first state.

2. The power supply circuit according to claim 1, further comprising a detection unit that detects a preliminary state related to the load, wherein the predetermined condition is that the preliminary state is detected by the detection unit.

3. The power supply circuit according to claim 2, wherein the preliminary state is at least one of states that (i) a predetermined time has elapsed since electric power is not supplied from the first power supply source to the load, (ii) a power supply request is made from the load to the control unit, (iii) an impact applied to the vehicle is detected, (iv) a door of the vehicle is operated, and (v) a power storage amount related to the second power supply source decreases.

4. A power supply method in a power supply circuit including a first electric path that electrically connects a first power supply source and a load, a second electric path that electrically connects a second power supply source and the load and that includes a converting unit that converts voltage related to electric power supplied to the load, and a third electric path that electrically connects the second power supply source and the load without intervening the converting unit and that includes a switching unit able to disconnect an electrical connection between the second power supply source and the load, the power supply method comprising:

a first control process of controlling the converting unit, and controlling the switching unit of the third electric path so as to disconnect the electrical connection between the second power supply source and the load via the third electric path such that a first state is established, the first state being a state in which electric power is supplied from the second power supply source to the load via the second electric path and electric power is not supplied to the load via the third electric path when electric power is not able to be supplied from the first power supply source to the load but is able to be supplied from the second power supply source to the load; and a second control process of controlling, when a predetermined condition related to the load is satisfied after the converting unit and the switching unit are controlled so as to establish the first state, the converting unit, and controlling the switching unit so as to electrically connect the second power supply source and the load such that a second state in which electric power is supplied from the second power supply source to the load via the second electric path and the third electric path is established, wherein:

when electric power is not able to be supplied from the first power supply source to the load but is able to be supplied from the second power supply source to the load, the control unit controls the converting unit and the switching unit so as to establish the first state after the control unit controls the converting unit and the switching unit so as to establish the second state, when the predetermined condition is satisfied, the control unit controls the converting unit and the switching unit such that the first state transitions to the second state, and when the predetermined condition is not satisfied, the control unit controls the converting unit and the switching unit so as to maintain the first state.

5. A non-transitory storage medium storing a computer program that causes a computer of a power supply circuit to function as a control unit, the power supply circuit including a first electric path that electrically connects a first power supply source and a load, a second electric path that electrically connects a second power supply source and the load and that includes a converting unit that converts voltage related to electric power supplied to the load, and a third electric path that electrically connects the second power supply source and the load without intervening the converting unit and that includes a switching unit able to disconnect an electrical connection between the second power supply source and the load, wherein:

the control unit controls the converting unit, and controls the switching unit of the third electric path so as to disconnect the electrical connection between the second power supply source and the load via the third electric path such that a first state is established, the first state being a state in which electric power is supplied from the second power supply source to the load via the second electric path and electric power is not supplied to the load via the third electric path when electric power is not able to be supplied from the first power supply source to the load but is able to be supplied from the second power supply source to the load; and when a predetermined condition related to the load is satisfied after the control unit controls the converting unit and the switching unit so as to establish the first state, the control unit controls the converting unit, and controls the switching unit so as to electrically connect the second power supply source and the load such that a second state in which electric power is supplied from the second power supply source to the load via the second electric path and the third electric path is established, wherein:

when electric power is not able to be supplied from the first power supply source to the load but is able to be supplied from the second power supply source to the load, the control unit controls the converting unit and the switching unit so as to establish the first state after the control unit controls the converting unit and the switching unit so as to establish the second state, when the predetermined condition is satisfied, the control unit controls the converting unit and the switching unit such that the first state transitions to the second state, and when the predetermined condition is not satisfied, the control unit controls the converting unit and the switching unit so as to maintain the first state.

* * * * *